Patented Apr. 1, 1930

1,752,567

UNITED STATES PATENT OFFICE

PETER A. McCULLOUGH, OF PITTSBURGH, PENNSYLVANIA

METHOD OF CUTTING LAMINATED GLASS

No Drawing. Application filed October 2, 1928. Serial No. 309,898.

The invention relates to laminated glass, commonly called in the art composite glass, and the object is to provide a method of producing pieces of predetermined shape and size from large sheets by a cutting operation which is simple, inexpensive as compared to prior practice, produces pieces of exact size, and which is readily practiced by those skilled in cutting ordinary glass and with the same types of tools employed for that purpose.

Laminated glass of the type herein contemplated comprises two or more superposed layers of glass having a transparent non-frangible binder interposed between and adhering to the adjacent surfaces of the glass. The binders generally used, such as pyroxylin or celluloid, possess sufficient flexibility and tenacity to maintain the pieces of glass in position when it is cracked or broken by shock, thus conferring to such laminated glass its so-called non-shattering properties.

The ordinary method of cutting glass is to provide a scored line of weakness and to break the glass along the line by applying bending stresses thereto. Attempts to apply this procedure to laminated glass have resulted in failure, because the binder, being normally tough and flexible, and being bonded to the glass, will not fracture in the transverse plane of the scored line. This prevents even fracturing of the glass itself. Therefore in the production of shaped and sized pieces of laminated glass it has been necessary to grind from a sheet of laminated glass the desired piece. Such a process is time-consuming and expensive, and requires special apparatus.

This invention is predicated upon my discovery that when laminated glass is cooled to a temperature at which the binder becomes brittle, it may be cut in the same manner as ordinary single-layer glass. The binder becomes as brittle as the glass. Since it adheres closely thereto at low temperatures, the break of the glass carries through just as with a single sheet.

According to the preferred practice of the invention, the surface of the glass is scored in the customary manner, with a diamond or the like, to outline the desired shape. The scored lines are disposed to provide a piece of correct, or substantially correct size when the glass is broken therealong, just as in regular glass cutting practice. In some instances scoring of one surface will suffice, but it is sometimes desirable to score both surfaces, the scored lines being opposed on the two surfaces, as will be readily understood.

After outlining the shape, the glass is subjected to such a reduced temperature that the binder becomes brittle like the glass, when it may be broken, or in the parlance of the trade cut along the scored lines of weakness substantially as if it were integral glass. The scoring may be done after the chilling, but is preferably done first, as will be readily understood.

Various means may be used to cool the glasses to the proper reduced temperature, the essential thing being that the glass is cooled at least to the point where the binder becomes brittle. For example, the scored glass sheets may be placed in a refrigerating chamber containing a fluid cooled by expansion of a suitable liquid refrigerant circulated through pipes or coils disposed therein. For thin laminated glass, the fluid may be air, while in the case of thick glass or with large articles, the fluid may be alcohol or other liquid which will not freeze at the temperature employed. Likewise, the scored glass may be placed in contact with the surface of frozen liquids or other solid heat-exchanging bodies cooled to the proper temperatures, as by refrigerating coils embedded therein. In using such a solid-contact procedure it will usually be desirable to preliminarily cool the glass, as by exposure to a refrigerating atmosphere, before placing the glass in direct contact with the chilling surface referred to. Any suitable refrigerant which will chill the heat-exchanging fluid or other body to the necessary reduced temperature may be used, for example, such as liquid air. Because different binders are used in the production of composite glass, it is not possible to specify an exact temperature to which such glass must be cooled in order to be cut by this process, but that temperature is quickly and easily determinable for each binder. Since a temperture as low as −300° F. may be obtained by liquid air refrigeration, it is possible to produce any higher temperature readily, and that range permits embrittling any of the binders heretofore used.

After the laminated glass has been properly chilled, it is broken in the same manner as ordinary glass, by the application of stresses to cause it to fracture along the scored lines of weakness, or by any other method applicable to brittle hard material like glass.

I claim:

1. The method of cutting laminated glass to size comprising chilling the glass to render it brittle throughout, and while chilled breaking the glass to form an accurately sized piece.

2. The method of cutting laminated glass to size comprising immersing the glass in a fluid at a temperature at which the binder becomes brittle, and breaking the glass while the binder is brittle to form an accurately sized piece.

3. The method of making sized pieces from laminated glass comprising scoring the surface thereof to outline the desired piece, chilling said sheet, and while chilled breaking the glass along said scorings.

4. The method of cutting sized pieces from laminated glass formed from a plurality of layers of glass having a flexible binder interposed between adjacent surfaces, comprising scoring the outer surface thereof to outline the desired piece, cooling the sheet to a point where said binder becomes brittle, and while chilled breaking the glass along said scored lines.

5. The method of cutting sized pieces from laminated glass formed from a plurality of layers of glass having a flexible binder interposed between adjacent surfaces, comprising forming scored lines of weakness on the outer surface of a sheet of said glass, cooling said glass to render said binder brittle, and while cooled breaking the glass along said lines of weakness.

In testimony whereof, I sign my name.

PETER A. McCULLOUGH.